Dec. 19, 1950     C. A. BARATELLI     2,534,655
OPHTHALMIC DEVICE
Filed Feb. 14, 1947

INVENTOR
Charles A. Baratelli
BY
Donald P. Brown
and
Moncure B. Berg
Attorneys

Patented Dec. 19, 1950

2,534,655

UNITED STATES PATENT OFFICE 2,534,655

OPHTHALMIC DEVICE

Charles A. Baratelli, Boston, Mass., assignor to Polaroid Corporation, Cambridge, Mass., a corporation of Delaware Application February 14, 1947, Serial No. 728,393

2 Claims. (Cl. 2—14)

This invention relates to ophthalmic devices such as sunglasses, goggles and the like, and more particularly has reference to a device of the character which makes use of a one-piece lens member which extends across the forehead and fully covers both eyes of the wearer when in use.

Objects of the invention are to provide a novel sunglass, goggle or the like which is of pleasing appearance, lightweight construction, and of an inexpensive nature, and which combines these features in a design adapted to fit the wearer with a maximum of comfort and to materially prevent objectionable reflection of light coming from behind the wearer and incident on the lens member of the device as well as to filter or modify light incident on the side of the face and to greatly reduce the disturbing effects thereof, and to embody these features and design in an ophthalmic device employing a one-piece lens member adapted to extend across the forehead and partially around the sides of the face of a wearer and having an extremely wide binocular field of vision.

Other objects of the invention are to provide an ophthalmic device having a lens member adapted to extend across the forehead and partially around the sides of the face which is mounted and substantially maintained in a generally cylindrical shape to have a flatly curved central section joined at opposite ends by side sections which are curved substantially alike but which are more sharply curved than the central section, as well as to provide in an ophthalmic device of such character a lens member having the generally cylindrical shape described which is substantially without power at least throughout the central section; and also to provide frame means for mounting such lens member.

Further objects of the invention reside in the provision of a sunglass, goggle or the like making use of a lens member formed of a transparent, deformable plastic material shaped to provide individual eye portions integrally joined to a bridge portion and having a nose pad mounted in a nose-engaging recess formed along the lower edge of the lens member, together with novel mounting means comprising a frame formed of a relatively lightweight channel element engaging the edge of the lens member and extending thereacross and partially around the sides thereof and which is braced or stiffened by a bar fixed to the frame on the face side thereof.

Still further objects of the invention are to provide an ophthalmic device having, in combination, a one-piece lens member adapted to extend across the forehead and partially around the sides of the face whereby the wearer may look therethrough with both eyes simultaneously, and which is formed of a transparent, deformable plastic material substantially maintained in a generally cylindrical shape to have a flatly curved central section joined at opposite ends by side sections which are curved substantially alike but which are more sharply curved than the central section, and means comprising a frame engaging the lens member and a bar fixed to and bracing the frame for mounting and substantially maintaining the lens member in the desired cylindrical shape and for effecting the positioning of the lens member when in use to have its concave surface adjacent the face and its elements nearly vertical, the frame being formed of a relatively thin, lightweight channel element shaped to substantially correspond to the generally cylindrical shape of the lens member, and being engaged with and extending across the upper end of the lens member and also engaged at the opposite sides of the lens member for a distance sufficient to substantially retain the lens member in the desired cylindrical shape substantially throughout its entirety, and temple means secured to the frame on opposite sides thereof.

Other objects of the invention will in part be obvious and will in part appear hereinafter.

The invention accordingly comprises the article possessing the features of construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
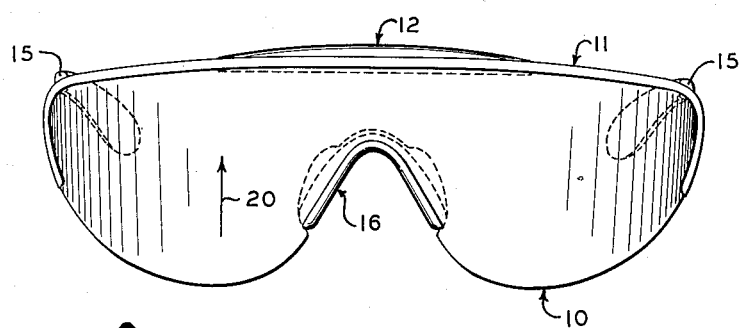
Figure 1 is a front elevation of an ophthalmic device of the invention.

The objectionable back reflection of light incident on a one-piece lens member of the character described may be lessened if the lens member is mounted in front of the eyes of a wearer so that it is held to conform in a very general manner with the contour of the forehead whereby the lens member has a gentle uniformly concave curvature on the side thereof facing the wearer. Such practice permits interception of some of the light incident on the side of the face and entering the space between the face and the inner surface of the lens member and at least to a slight extent reduces the objectionable effects caused by this side light. The present invention provides a sunglass or goggle design whereby back reflection is materially reduced and the objectionable effects produced by entering side light are substantially overcome.

In carrying this concept into effect, use is made of a design employing a one-piece lens member 10 having a bridge portion and opposite eye portions integral therewith, the same being mounted in frame means comprising a frame member 11 which is braced or stiffened by bar or brace means 12 located on the inner side of the frame member 11. Frame 11 is a relatively lightweight channel element which extends across the lens member 10 and partially around the sides thereof and within which the upper and side edges of the lens member are engaged. As shown in the drawings, the ends 14 of the bar 12 are upset and suitably formed to provide a seat whereby temple 15 may be hinged thereto by any conventional fastening means.

With respect to Figs. 1, 2, and 3, lens 10 below its bridge portion is provided with a nose-engaging recess adapted to receive a nose pad 16. The latter may be formed of any conventional plastic material suitable for this purpose and is mounted within the nose-engaging recess. Nose pad 16 is suitably constructed to engage and grip the edge of the lens member 10 and is retained in position by having a frictional or pressure fit therewith or by being cemented or bonded to the lens member, or by any combination of these practices for securing it in position.

Figure 5:
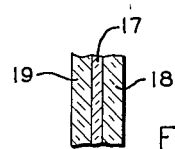
Fig. 5 is a broken away section through an embodiment of the lens member and discloses its construction.

Lens member 10 is formed of a suitable transparent, deformable plastic material and may comprise a single sheet or a lamination of several sheets of such material. A preferred practice, shown in Fig. 5, makes use of a lamination formed of a central sheet 17 of transparent plastic which is sandwiched between outer protecting plastic sheets 18 and 19. In this embodiment, the sheet 17 has the property of modifying incident light, as by a filtering action or by polarizing the same.

Sheet 17 is preferably formed of any transparent, hydrophilic, linear polymeric plastic material which may be treated to effect a desired orientation of its molecules. An example of a preferred material of this character is polyvinyl alcohol. As examples of other such materials mention may be made of partially hydrolyzed polyvinyl acetals and polyvinyl alcohol esters, amylose, regenerated cellulose, and suitably prepared nylon-type plastics. When the just-named materials are in molecularly oriented condition and are stained or dyed with a dichroic material, they become light polarizing.

Sheets 18 and 19 are preferably formed of any hydrophobic or nonhydrophilic plastic material, and examples thereof comprise cellulosic plastics such as cellulose nitrate or cellulose esters such as cellulose acetate and cellulose propionate, or cellulose mixed esters such as cellulose acetate butyrate, or a vinyl compound such as the vinyl acetate-vinyl chloride copolymers, or a condensation type superpolymer such as a polyamide or nylon-type plastic. It is possible to incorporate a dye, as by casting, in the cellulosic plastics just named, and in such event the same may be employed as the light-modifying sheet of the lamination. Obviously, any of the materials just described, if of sufficient thickness, may be used in place of the three-layered lamination described in connection with Fig. 5.

For the sake of illustration, the invention is disclosed in connection with a lens member 10 having the ability to polarize light, the light-polarizing sheet of the lens member being arranged so that the transmission axis thereof is substantially vertical as indicated by the arrow 20 in Fig. 1. For this purpose, any of the heretofore mentioned hydrophilic, linear polymeric plastics may be employed. A preferred example of such a material is disclosed in the patent to Edwin H. Land, No. 2,237,567, for Light Polarizer and Process of Forming the Same. Another suitable polarizing material for this purpose is disclosed in the patent to Edwin H. Land and Howard G. Rogers, No. 2,173,304, for Light Polarizer. Other types of polarizers may be utilized with the invention, for as previously indicated, the scope of the invention is comprehensive of any type of sheet polarizing material.

Lens member 10 may also be constructed to provide modifying effects upon light besides the polarization thereof such, for example, as effecting the absorption of light which is incident on the lens member and which falls within a predetermined portion or portions of the spectrum, including the ultraviolet and the infrared portions thereof. Effects of this character may be obtained by appropriate treatment of the light-modifying sheet used with lens member 10 and includes the use of a dye or combination of dyes incorporated in the sheet material.

Figure 4:
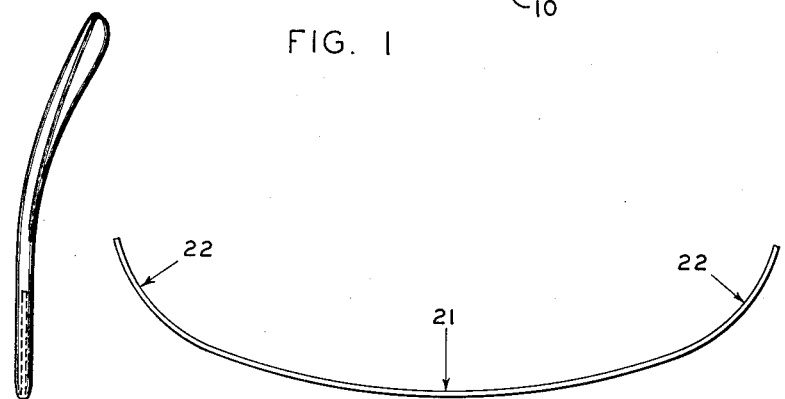
Fig. 4 is a plan view of the upper edge of the lens member and diagrammatically illustrates the general cylindrical curvature of the lens member.
Figure 2:
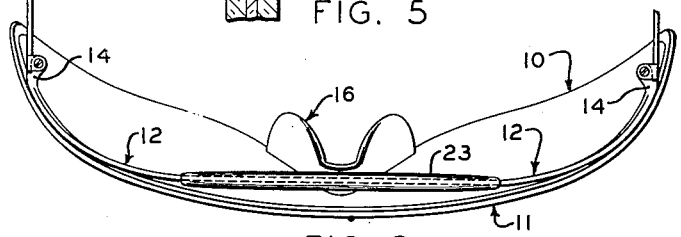
Fig. 2 is a plan view taken from the top of the ophthalmic device of Fig. 1.
Figure 3:
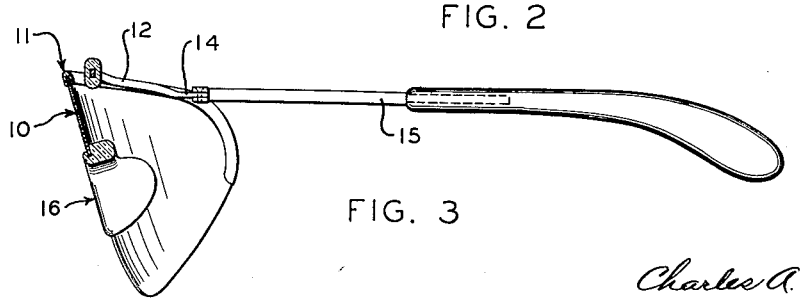
Fig. 3 is a vertical section of the ophthalmic device of Fig. 1.

With particular reference to Figs. 1, 2 and 4, it may be observed that the lens member 10 is mounted and maintained in a generally cylindrical shape so that the elements thereof are positioned nearly vertical and the concave surface of the lens member is positioned adjacent to the face of the wearer when the ophthalmic device is being worn. In imparting such cylindrical shape, the lens member 10 is made up of at least three sections comprising a central section 21 having a relatively flat curvature joined by end sections 22 having similar curvature with respect to each other but more sharply curved than the central section.

As shown in Fig. 4, the central section is relatively long and extends well across the forehead and has a curve which generally conforms to the forehead, whereas the end sections are relatively short and are sharply curved so as to fit around the sides of the face adjacent the eyes. With such an arrangement, the overall length of the lens is sufficient so that its ends extend to positions on the sides of the face somewhat in back of the eyes. It is by this expedient of modeling a generally cylindrical lens to closely fit the front as well as the side contour of the face that the sunglass or goggle of this invention overcomes effects of back reflection and side light. Central section 21 may have a uniform curvature throughout or it may have variations in curvature and similarly end sections 22 may have uniform curvature throughout or they may have variations in curvature.

It is desirable to provide ophthalmic devices of the character described with a lens member which is substantially without or substantially lacks any lens power. In the present invention this is especially true with respect to the central section 21 of the lens member 10 which is the main portion of the lens 10 through which a person looks. It is to be noted that a person normally perceives objects to the side of his eyes and does not look at them without turning his head, so that the end sections 22 of the lens member 10 represent portions of the lens through which objects are normally only perceived whereas the central portion affords the visual area.

It therefore becomes possible to employ a lens power in the side sections 22 which would be objectionable in the central section of the lens element 10. Roughly speaking, the central section of the lens member 10 has a length of about 1⅔ times the interocular employed for the sunglass or goggle and within its area the power of the lens is kept within a maximum of about 1/16 of a diopter, which amount of power, as will be well understood by the art, is negligible. In portions of the central section through which the user cannot look or through which he does not normally look, a lens power exceeding the maximum just noted may occur. The normally used visual area in a vertical direction will extend about 15 millimeters above and below the interocular points.

Lens member 10 is mounted and maintained in the generally cylindrical shape described by means of the frame 11. Frame 11, as previously mentioned, is formed of a lightweight channel member. Any metal, for example, gold or silver, or the like, or suitable alloys conventionally employed with ophthalmic devices may be used for this purpose. Plastic materials may also be employed for the frame 11. The length of the frame 11 is sufficient to extend across the upper edge of lens member 10 and partially around the sides thereof. Frame 11 slopes downwardly from its center towards its ends and engages the outer marginal edge of the lens member. Engagement with the edge of the lens member along the sides thereof is for an extent or distance sufficient to substantially retain the lens member in the desired generally cylindrical shape substantially throughout its entirety. Lens member 10 is merely inserted within the channel member forming the frame 11 and is retained therein by a friction or pressure fit or may be riveted or cemented therein.

Since the frame member 11 is of relatively light gauge material, it is desirable to brace the same, and stiffening thereof is effected through means of the heretofore-mentioned bar 12 which is positioned on the face side of the frame and extends across the top thereof. Bar 12 has its ends fixed to the frame member and its central portion free of the frame member as it is clearly indicated in Fig. 2. Bar 12 may be formed of any of the metals or alloys heretofore noted or it may be of plastic material. Soldering, welding, riveting or cementing or like practices may be employed in fixing bar 12 to frame 11. The cross section of bar 12 may be of any shape and preferably the bar is solid although it may be in tubular form. An enlarged central section is formed on the bar 12 by the member 23 which forms a rest against the brow when the ophthalmic device is worn and which partially extends above the frame as shown in Fig. 1. Member 23 may be of plastic material and the bar 12 may be inserted therein or extended therethrough Besides forming a seat against the forehead, bar 12 and the brow rest 23 operate to assist in positioning the lens element and its nose pad 16 upon the face with the elements of the lens member nearly vertical.

A further function of the bar 12 is to provide means for allowing temples 15 to be secured to the device. As it has been pointed out, the ends of the bar 12 are upset whereby temples 15 may be hinged thereto.

It is important to observe that frame 11, in plan, has a curvature which is substantially similar to the cylindrical shape of the lens member 10, as may be observed with respect to Figs. 2 and 4. Thus, the frame has a central section of a relatively flat curvature and end sections of similar curvature with respect to each other but of sharper curvature than the central section. The stiffening action of the bar 12 allows this curvature to be maintained in the frame 11.

Lens member 10 may be cut from plastic material which is normally flat and may be inserted within the channel forming the frame 11. When such practice is followed, by reason of the construction of the frame and its stiffening means 12, the lens member will be retained in the desired cylindrical shape heretofore described. Alternatively, the lens member 10 may be preformed into at least the approximately desired cylindrical shape. This alternate practice facilitates assembly of the frame and lens. However, regardless of which practice is employed, it will be apparent that the frame 11 and the stiffening bar 12 will retain the lens member in the desired cylindrical shape by reason of the frame having a similar shape and a length sufficient to reinforce the lens member along the sides thereof.

The sunglass or goggle of the invention has been illustrated as provided with paddle temples having metal butts and plastic ends. In lieu of such a construction, any other types of temples may be employed such as all-metal temples or all-plastic temples, or the like.

The formation of a lens of a generally cylindrical shape without lens power is made possible by the use of material of an extremely thin nature such as is afforded by the plastic materials described herein. For example, lenses excellently suited for the practice of the invention have been provided through the use of a lamination of the type described in connection with Fig. 5 and having an overall thickness from outer surface to outer surface of around 0.035 inch. That such is the case may be illustrated with respect to the well-known formula applicable for calculating the focal length or lens power of a lens with concentric surfaces. This formula is as follows:

$$\frac{t(n-1)}{nR(R-t)} = \frac{1}{f}$$

wherein:

$t$ = thickness of the lens material
$n$ = index of refraction of the lens material
$R$ = radius of curvature of the outer surface of the lens; and
$f$ = focal length The reciprocal of the focal length or $$\frac{1}{f}$$

when $t$ and $R$ are in millimeters is expressed in diopters, as will be well understood by the art.

The thickness $t$ may be neglected in the expression $(R-t)$ above, when $t$ is extremely small with respect to $R$, as is the case of the plastic materials heretofore described, It will therefore appear that the power in diopters is proportional to the thickness and the square of the curvature where the curvature is equal to the reciprocal of the radius or $$\frac{1}{R}$$

In working with the just-noted formula, it is to be noted that the plastic materials mentioned herein have an index of refraction of about 1.5. By reason of the foregoing, it follows that a suitable curvature for a cylindrical design providing a close fit to the front and sides of the face and wherein objectionable lens powers are avoided may be obtained within the maximum limit of about $\frac{1}{8}$ diopter, at least for the central section of the lens member 10.

With a lens design of the character set forth, it is to be noted that the lens member has an extremely wide field of vision and that this field is substantially unobstructed except for some interference from the nose pad 16. However, such interference is small as evidenced by the fact that the sunglass or goggle of the invention has an unobstructed binocular field of vision of fifty degrees, which is considered by the art as a field of very large magnitude. At the same time, the monocular field of the sunglass or goggle is substantially unlimited and in this respect is comparable with the field of monocular vision of the eyes.

The terms "cylinder" and "cylindrical" as used herein are intended to imply a surface traced by a straight line, called an element, moving parallel to a fixed straight line, and in using the terms "a generally cylindrical shape," reference is made to a surface having characteristics generally similar to a cylinder. Also in speaking of a cylindrical surface with elements nearly vertical, the use of the term "vertical" is employed in an ophthalmic sense and is intended to imply that the elements of the cylinder are nearly perpendicular to the interocular line.

Since certain changes may be made in the above article without departing from the scope of the invention herein involved, it is intended that all matter contained in the above description or shown in the accompanying drawings shall be interpreted as illustrative and not in a limiting sense.

What is claimed is:

1. In an ophthalmic device having a lens member of deformable, transparent plastic material which is adapted to extend across both eyes of a wearer of the device and which has its lower edge provided with a nasal recess located centrally of its ends while its upper edge is substantially unbroken and is of convex shape, said lens member being mounted and maintained in a condition of curvature which conforms to the general contour of the face whereby the inner surface of said lens member adapted to be located adjacent the face is concavedly curved and the outer surface of the lens member is convexedly curved, in combination, means for mounting and substantially maintaining said lens member in a desired curvature and also for effecting the positioning of the lens member on the face of a wearer, said means comprising a frame formed of a relatively thin, lightweight metal channel member substantially continuously engaged for its full length with the opposite faces of said lens member and a bar fixed to and stiffening said channel member forming said frame and maintaining said channel substantially rigid, said channel member extending across the upper edge of said lens member and partly around the side edges of the lens member and having a central section which in plan is concavedly curved on the inner surface thereof in a relatively flat curve, the central section of said channel member being joined at opposite ends by side sections which are of similar curvature with respect to each other and which in plan are also concavedly curved on the inner surfaces thereof but in sharper curvature than said central section, said channel member also curving downwardly from its center toward its ends and being of a length to reinforce the lens member along the sides thereof whereby to retain it in its curved condition, said bar being located on the side of the frame adapted to be positioned nearest the face of the wearer and being secured near its ends to said frame whereby to substantially maintain the frame in said curvatures, said bar having a central portion spaced from said frame and bearing against the forehead when said ophthalmic device is being worn to assist in positioning the lens member and its nasal recess in viewing position upon the face of the wearer with the elements of the lens member nearly vertical, and temple means hinged to each end of said bar.

2. In a sunglass, goggle and the like, having a lens member which is adapted to extend across the forehead and partially around the sides of the face and which is formed of a transparent, deformable plastic material adapted to be substantially maintained in generally cylindrical shape to have a flatly curved central section joined at opposite ends by side sections which are curved substantially alike but which are more sharply curved than the central section, in combination, means for mounting and substantially maintaining said lens member in said cylindrical shape and also for assisting in the positioning of the lens member on the face of a wearer, said lens member when in use having its concave surface adjacent the face and its elements nearly vertical, said means comprising a frame formed of a relatively thin, lightweight metal channel member substantially continuously engaged for its full length with the opposite faces of said lens member and a bar fixed to and bracing the channel member forming said frame and maintaining said channel member substantially rigid, said channel member extending across the upper edge of said lens member and partly around the side edges of said lens member and being shaped to have in plan an outline in a horizontal plane which is curved to substantially correspond to the cylindrical shape desired for said lens member, said bar being located on the side of said frame adapted to be positioned next to the face of the wearer and having a central portion spaced from said frame and bearing against the forehead when said sunglass, goggle and the like is being worn whereby to assist in placement of said sunglass, goggle and the like in proper viewing position upon the face of the wearer, said bar also having its ends enlarged and providing a connection for a hinge member, and a pair of temple members each having a hinge member at one end thereof pivotally secured to an enlarged end portion of said bar.

CHARLES A. BARATELLI.

REFERENCES CITED

The following references are of record in the file of this patent:

UNITED STATES PATENTS

| Number | Name | Date |
|---|---|---|
| 1,166,493 | Thompson | Jan. 4, 1916 |
| 1,868,362 | Nowak | July 19, 1932 |
| 2,337,617 | Miller, Jr. | Dec. 28, 1943 |
| 2,393,837 | Swanson | Jan. 29, 1946 |
| 2,397,243 | Cooper, Jr. | Mar. 26, 1946 |

FOREIGN PATENTS

| Number | Country | Date |
|---|---|---|
| 148,616 | Germany | Feb. 26, 1904 |